Jan. 23, 1968  E. A. McMAHON  3,364,744
EXPENDABLE BATHYTHERMOGRAPH
Filed April 13, 1965  3 Sheets-Sheet 2
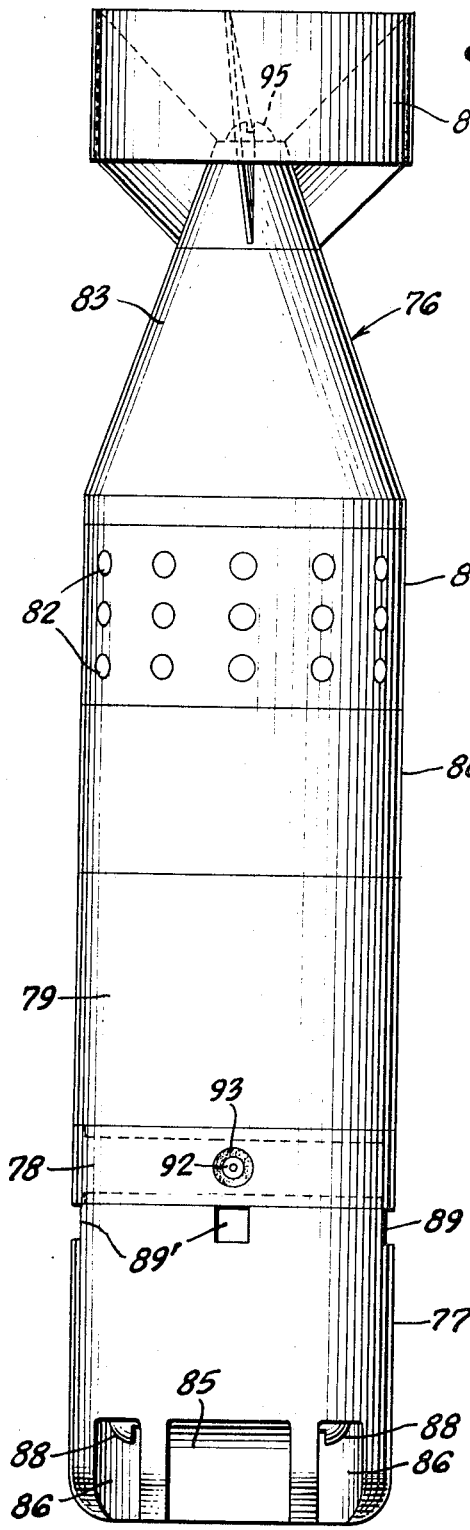
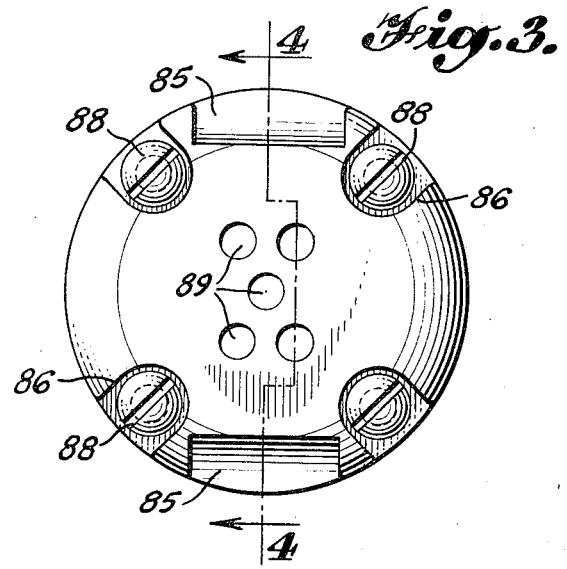
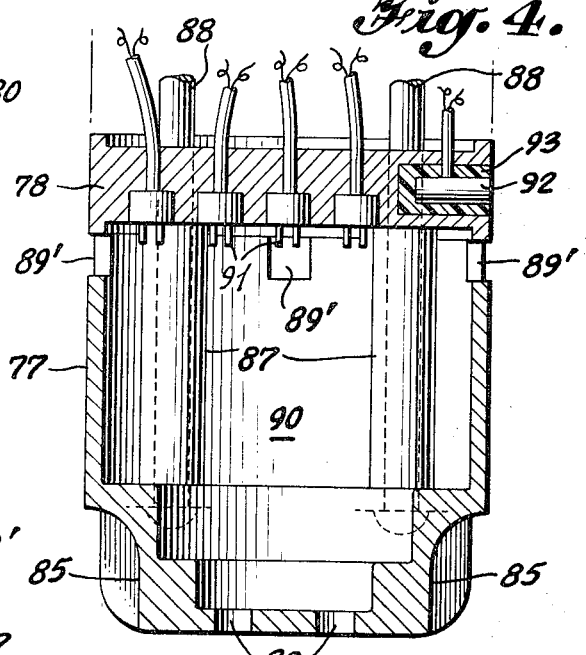
INVENTOR
Eugene A. McMahon
BY
Stevens, Davis, Miller & Mosher
ATTORNEYS Jan. 23, 1968
E. A. McMAHON
3,364,744
EXPENDABLE BATHYTHERMOGRAPH
Filed April 13, 1965
3 Sheets-Sheet 3
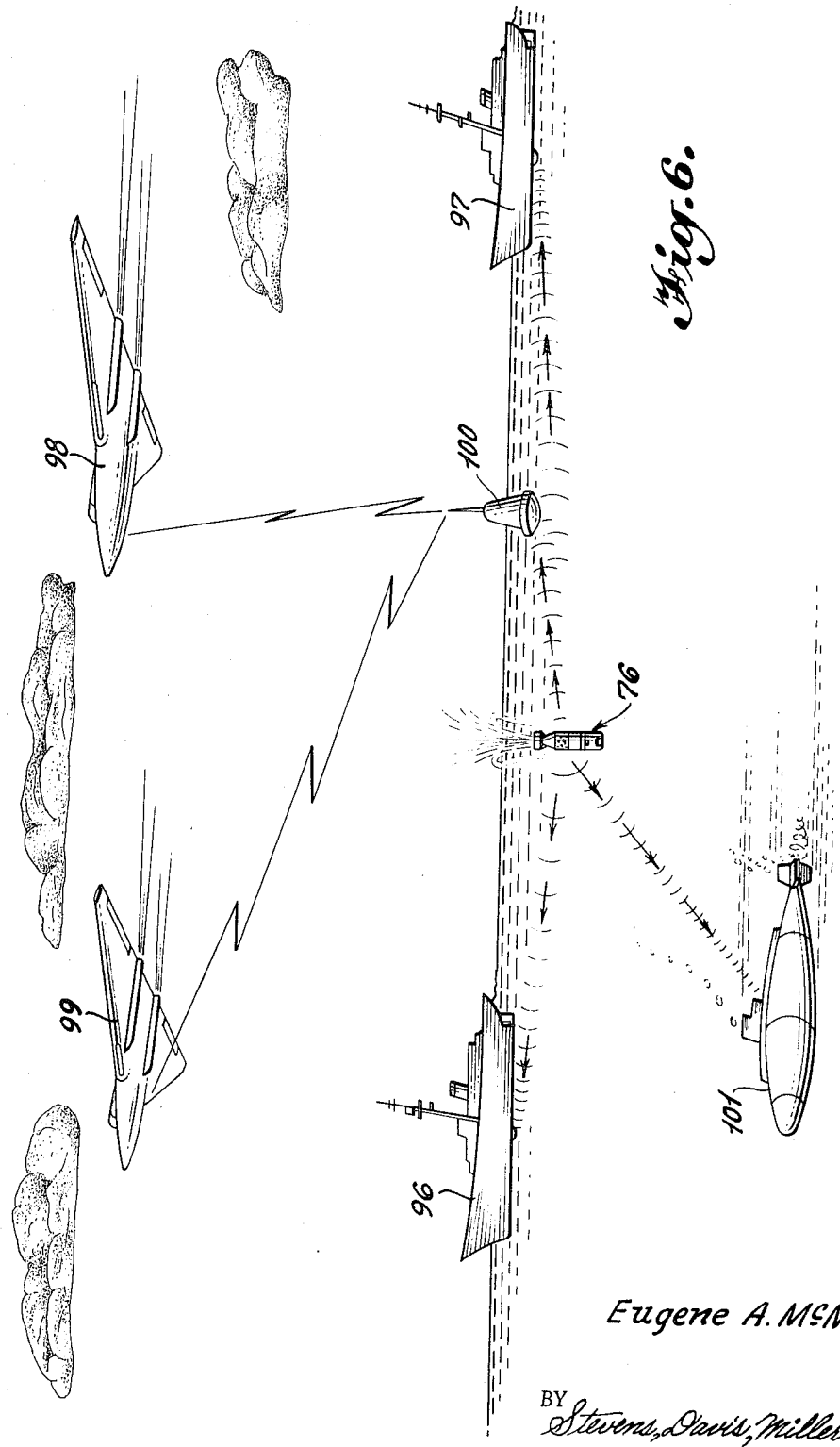
INVENTOR
Eugene A. McMahon
BY Stevens, Davis, Miller & Mosher
ATTORNEYS United States Patent Office 3,364,744
Patented Jan. 23, 1968

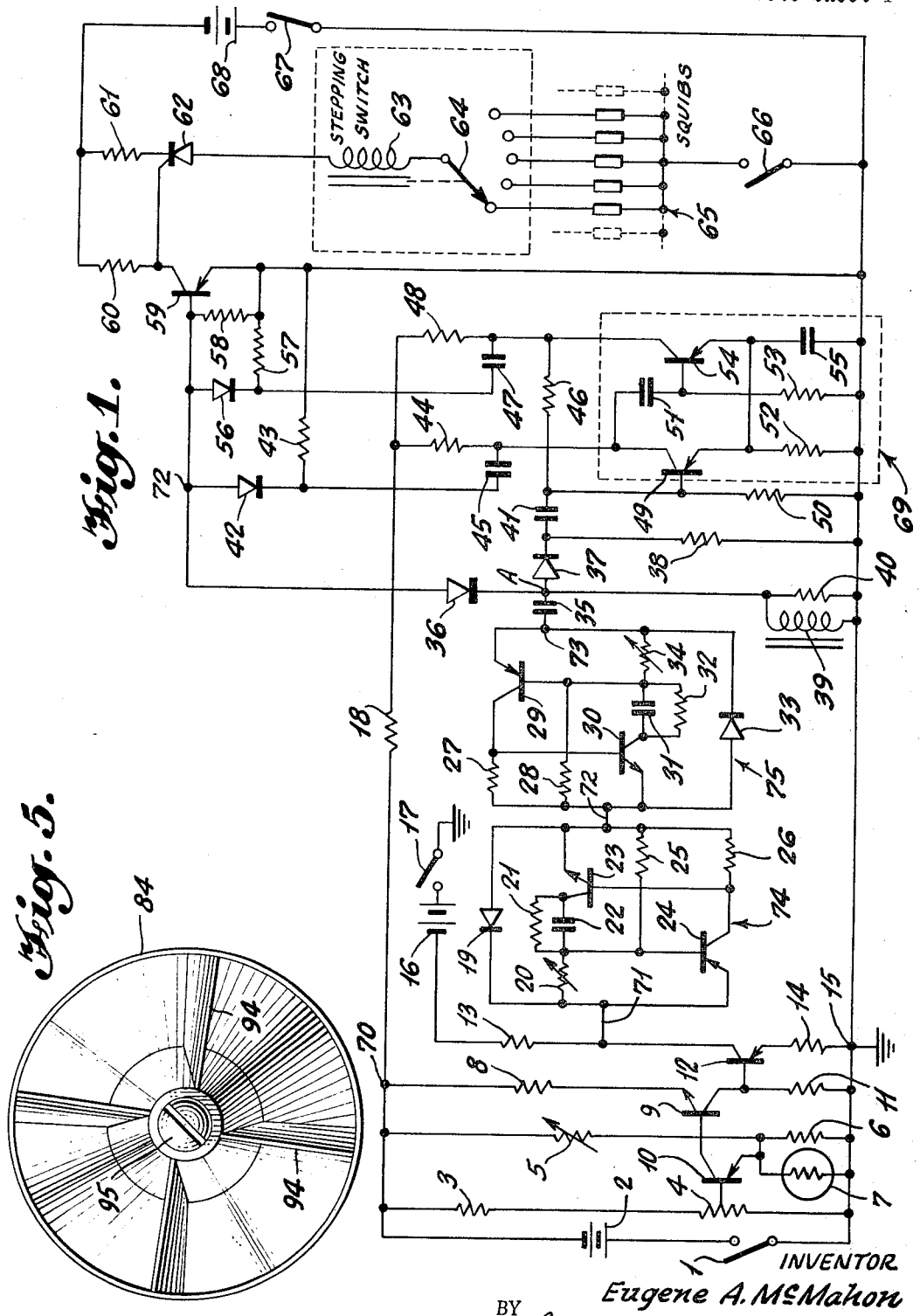

3,364,744
EXPENDABLE BATHYTHERMOGRAPH
Eugene A. McMahon, Fort Lauderdale, Fla., assignor to Halliburton Company, Duncan, Okla., a corporation of Delaware
Filed Apr. 13, 1965, Ser. No. 447,772
7 Claims. (Cl. 73—343)

ABSTRACT OF THE DISCLOSURE

A bathythermograph having a thermistor temperature sensor to control the voltage level applied to a threshold and storage device including a capacitor initially charged to a reference level. Upon a predetermined change of the voltage level, the capacitor is charged to the new level and a pulse with a polarity dependent upon the direction of such change is produced. Electrical circuitry is provided to energize sonic signal means either once or twice in rapid succession depending upon the polarity of the pulses.

This invention relates to a bathythermograph and, more specifically, to a bathythermograph for providing detonations during underwater descent to provide an indication of temperature changes in a fluid.

Many prior attempts have been made to provide a low cost, expendable bathythermograph which is capable of being integrated into existing shipboard or aircraft sonar systems, which may be hand or air dropped, which has a high order of accuracy and dependability, which does not require reduction in ship or aircraft speed for launching, which requires no external connections, which has a very long audibility range and which is limited in its operation only by audibility limitations of receiving transducers. However, all prior art bathythermographs have failed to display all of the above desired properties and therefore suffer certain inherent disadvantages. These disadvantages are overcome in accordance with the present invention wherein a bathythermograph is provided having all of the desirable properties required. Briefly, in accordance with the present invention, a transistorized, temperature responsive detonating circuit is placed in a bathysphere or a similar device and the entire unit is deposited into a fluid medium. For the purpose of illustration, a salt or ocean water medium is assumed. Salt water operated switches for connecting a source of voltage to the detonating unit are closed by the appearance of salt water therein upon immersing the unit in the water, to provide a voltage for the entire circuit. As the unit descends into the liquid, a thermistor senses the temperature of the surrounding liquid and provides an increase or decrease of voltage at a predetermined point, depending upon the direction of temperature change. For each unit change of liquid temperature one of two circuits is energized depending upon the direction of temperature change. One of the said circuits detects temperature increase and the second said circuit detects temperature decrease. The output of the first circuit operates a monostable flip-flop and causes a squib to be detonated both upon triggering of the flip-flop to the second state of operation thereof and on the return of the flip-flop to the stable state of operation, thereby providing to detonations to indicate a unit increase in temperature. The output of the second said circuit operates the detonator to detonate one squib to indicate a unit decrease in temperature. Since the substantially constant rate of descent of the bathythermograph is known, it is possible to plot a graph of unit positive and/or negative temperature changes at the proper depths. It is an object of the present invention to provide a low cost expendable bathythermograph which is capable of being integrated into existing shipboard or aircraft sonar systems, which may be hand or air dropped, which has a high order of accuracy and dependability, which does not require reduction in ship or aircraft speed for launching, which requires no external connections, which has a very great audibility range and which is limited in its operation only by sensitivity of receiving transducers.

It is a further object of this invention to provide a device for measuring the temperature of a liquid at various depths in response to liquid temperature change.

It is a still further object of this invention to provide a liquid temperature increment measuring device wherein a different signal is provided for positive and negative temperature changes.

Another object of the invention is the provision of a method of rapidly and accurately gathering temperature gradient data without causing a divergence from tactical operations.

Another object is to make available temperature gradient data to several surface vessels and aircraft substantially simultaneously by the use of a single bathythermograph and sonobuoy.

These and further objects of the invention will become apparent to those skilled in the art from the following preferred embodiment of the invention, which is provided by way of example and not of limitation, wherein:

FIGURE 1 is a schematic diagram of the temperature increment measuring circuit in accordance with the present invention.

FIGURE 2 is a front elevation of the bathythermograph.

FIGURE 3 is an end view of the front end piece.

FIGURE 4 is a sectional view taken along line 4—4 in FIGURE 3.

FIGURE 5 is a top view of the fin section.

FIGURE 6 demonstrates the method of using the bathythermograph.

Referring now to FIGURE 1, a salt water operated switch which is commonly used in the art, closes upon submersion thereof in salt water, and is connected in series with the positive terminal of a D-C voltage supply across the terminal 70 and a source of reference potential 15. Also, series connected resistor 3 and variable resistor 4 are connected across points 15 and 70 as are series connected variable resistor 5 and resistor 6. A thermistor 7 is connected between the junction of resistors 5 and 6 and reference potential. The thermistor, upon entering the water quickly assumes the temperature of the water due to the fact that the thermistor is exposed thereto as can be seen in FIGURE 2. The salt-water switches, however, have a built-in delay to insure that the thermistor is at water temperature when said switches close. Further connected across points 15 and 70 are series connected resistor 8, connected to the emitter of NPN transistor 9, the collector of which is coupled to resistor 11. The base of transistor 9 is coupled to the collector of PNP transistor 10, the base of transistor 10 being coupled to the tap of resistor 4 and the emitter of transistor 10 being coupled to the junction of resistors 5 and 6.

The collector of transistor 9 is also coupled to the base of PNP transistor 12, the emitter of which is coupled to reference potential through resistor 14 and the collector electrode of which is coupled through resistor 13 to the negative terminal of battery 16. Battery 16 is connected to reference potential through a salt water switch 17, similar to switch 1.

The collector of transistor 12 is connected to junction 71. Junction 71 is coupled to junction 72 through a first path comprising diode 19 poled to pass negative current, through a second path comprising a resistor 20 coupled through a parallel resistor 21 and capacitor 22 and the collector-emitter circuit of NPN transistor 23, through a third path comprising resistors 20 and 25 and through a fourth path comprising the emitter-collector circuit of PNP transistor 24 and resistor 26. The base of transistor 24 is coupled to junction of resistors 20 and 25 while the base of transistor 23 is coupled to the junction of the collector of transistor 24 and resistor 26.

Junction 72 is coupled to capacitor 35 at point 73 through a first path comprising a diode 33 poled to pass positive current therethrough, through a second circuit comprising the emitter-collector circuit of an NPN transistor 30 coupled through a parallel resistor 32 and capacitor 31 and the resistor 34, through a third path comprising resistor 28 and resistor 34 and through a fourth path comprising resistor 27 and the collector-emitter circuit of PNP transistor 29. The base of transistor 29 is connected to the junction of resistors 28 and 34 while the base of transistor 30 is connected to the junction of resistor 27 and the collector of transistor 29.

Capacitor 35 is coupled through paralleled coil 39 and resistor 40 to reference potential and also to the base of NPN transistor 59 through diode 36 poled to pass negative voltage. Capacitor 35 is also coupled through diode 37, poled to pass positive voltage, and resistor 38 to reference potential, diode 37 being coupled through capacitor 41 and resistor 50 to reference potential.

The base of transistor 59 is coupled through diode 42 and resistor 43 to reference potential. Also diode 42 is coupled through capacitor 45 to the collector of PNP transistor 49 of monostable multivibrator 69. The diode 56 is also coupled between the base of transistor 59 and reference potential through resistor 57, diode 56 also being coupled through capacitor 47 to the collector of PNP transistor 54 of multivibrator 69. Junction 70 is coupled through resistor 18 and resistor 44 to the collector of transistor 49. Function 70 is also connected to the collector of transistor 54 through resistor 48 and resistor 18. The base of transistor 59 is also connected to reference potential through resistor 58.

The multivibrator 69 includes a transistor 49, the base of which is coupled to the junction of capacitor 41 and resistor 50, the collector of which is coupled through resistor 51 to the base of transistor 54, which is coupled through resistor 53 to reference potential. The emitters of transistors 49 and 54 are connected to reference potential through the parallel resistor 52-capacitor 55 circuit.

The negative terminal of a D-C supply 68 is connected through resistor 60 to the collector of transistor 59 and through resistor 61 to the cathode of silicon controlled rectifier (SCR) 62. The gate of the SCR is connected to the collector of transistor 59 while the anode thereof is connected through the coil 63 of a stepping switch and an armature 64 to one of a plurality of contact elements, each contact element being coupled to one terminal of a squib, the other terminal of each said squib being connected in common through switches 66 and 67, similar to switch 1, to the positive terminal of battery 68.

In operation, the bathythermograph is submerged in water, thereby activating and closing the salt water switches 1, 17, 66 and 67 thereby supplying a potential to the various portions of the circuit and placing the squibs in the circuit. Thermistor 7 is responsive to the water temperature and supplies a voltage to the base of transistor 9 through transistor 10, the base of which is properly biased by resistor 4. The bias voltage of transistor 10 depends upon the resistance value of the thermistor due to water temperature. Resistors 4 and 5 linearize the output from the thermistor 7. The transistor 9 increases its conduction with a positive change of voltage at the base thereof and, conversely, decreases its conduction with a negative change in its base voltage. This current change in transistor 9 varies the voltage drop across resistor 11 and thereby varies the base voltage of transistor 12, this base voltage changing negatively with increase of current through transistor 9. A positive change in base voltage of transistor 12 causes a decrease in conduction thereof and, thereby, a negative change in voltage at the junction 71.

Two analogus circuits 74 and 75 generally as shown are connected in series from junction 71 through point 73, through capacitor 35, and coil 39 and resistor 40 to common. Circuits 74 and 75 and capacitor 35 function as threshold devices or detectors of unit positive or unit negative voltage changes, respectively, between junction 71 and reference potential and, accordingly, develop positive or negative voltage pulses at terminal A. When the circuit is initially connected to the batteries by placement in water, the potential at the collector of transistor 12 goes to a negative voltage while the voltage across capacitor 35 is zero volts. As the collector of transistor 12 swings to its negative voltage, the capacitor 35 has a potential difference thereacross. Accordingly, current passes through the low impedance diode 19 (due to forward bias) and substantially short circuiting the left switching circuit 74. Diode 33, however, is a high impedance source due to its reversed bias condition and, as a result, a potential difference appears across this diode 33 or across points 72 and 73.

Transistors 29 and 30 are both initially cut off; however, a small current passes through resistor 28 and the base to emitter junction of transistor 29 to capacitor 35. Variable resistor 34 is adjusted so that when a potential difference of 1½ volts appears thereacross, sufficient current is supplied to the base of transistor 29 to allow current flow through resistor 27. The voltage drop across resistor 27 biases transistor 30 "on." Further action is regenerative. The circuit has thus been switched from the "off" state to the "on" state.

Current passing through the switches 74 and 75 charge out capacitor 35 and, when the capacitor 35 is fully charged, these switches turn "off" or are in their high impedance condition.

As the collector of transistor 12 goes more negative, the voltage across capacitor 35 follows this change of potential in a series of steps. During the current pulse generated at each step, a potential is displayed across resistor 40 as a negative voltage pulse. The inductive effect of coil 39 enhances the magnitude and shape of the voltage pulse. In the same manner, a positive voltage swing of the collector of transistor 12 causes the switching circuit 74 to conduct while diode 33 acts as a short circuit path, thereby substantially short circuiting the switch 75 and providing a voltage pulse of positive polarity across resistor 40.

It can be seen that the voltage on the collector of transistor 12, after commencement of operation, is proportional to the resistance of thermistor 7, this resistance being proportional to the water temperature.

Diodes 36 and 37 will conduct in accordance with the polarity of the signal pulse applied thereto across resistor 40. A negative going pulse will pass through diode 36 whereas a positive going pulse will pass through diode 37.

A pulse passing through diode 36 is applied to the base of transistor 59, the driver for the SCR 62, and turns "on" the SCR. Termination of the pulse permits transistor 59 to return to the "off" condition thereby removing the SCR gate potential. Current therefore passes through the stepping switch coil 63 and the squib 65 to which the coil is then connected, detonating this squib.

Detonation of the squib opens the anode circuit of the SCR and shuts "off" the SCR which is by then no longer energized by the exciter transistor 59. When the firing current through coil 63 is cut off, the stepping switch armature moves to the next squib which is then placed in the circuit.

A positive pulse across resistor 40 will be gated through diode 37 and trigger a monostable multivibrator 69. Transistor 49 is conducting and transistor 54 is cut off, having no base current supply thereto. A positive pulse gated through diode 37 is applied to the base of transistor 49 and causes this transistor to switch to the non-conducting state. The collector of this transistor then swings negatively, this negative swing being conducted through capacitor 45 and diode 42 to the base of transistor 59 and fires a squib in the manner described supra. Coil 63 prevents transients or inadvertent surges from firing the squibs and said squibs can only be fired when SCR 62 is positively triggered.

The negative swing at the collector of transistor 49 causes a voltage drop across capacitor 51 and charges this capacitor to a new potential, applying current therethrough to the base of transistor 54 during the charging period. Therefore, when transistor 49 is turned "off," transistor 54 is turned "on." The voltage at the collector of transistor 54 swings from a high to a low negative potential, resulting in a net positive output. When capacitor 51 becomes fully charged, current is no longer supplied therethrough to transistor 54 and the multivibrator reverts to its stable or original state. At this time, the collector of transistor 54 swings to a more negative level and passes a current pulse through capacitor 47 and diode 56 to the base of transistor 59. Accordingly, a second squib will be fired in the manner previously described. The time interval between firing the first and second squib for an increase in temperature is relatively short compared to the anticipated time occurring between minimum unit temperature changes experienced by the descending bathythermograph.

It is therefore apparent that one squib is detonated for a unit negative temperature change and that two squibs are detonated for a unit positive temperature change.

Since the sink rate of the bathythermograph is known, the unit temperature changes can be plotted with respect to depth.

A typical circuit in accordance with the present invention could include circuit parameter values as follows:

Resistor:
  3—4.7K
  4—1K
  5—47K
  6—3.9K
  8—1K
  11—2.2K
  13—1K
  14—100
  18—2.2K
  20—20K
  21—82K
  25—470K
  26—22K
  27—22K
  28—470K
  32—82K
  34—20K
  38—10K
  40—680
  43—680
  44—1.2K
  46—18K
  48—1.2K
  50—4.7K
  52—150
  53—4.7K
  57—680
  58—4.7K
  60—1.2K
  61—2.7

Capacitor:
  35—24 μf.
  41—0.22 μf.
  45—1 μf.
  47—1 μf.
  51—10 μf.
  55—75 μf.
Thermistor 7—35A1
Transistor:
  9—2N169A
  10—2N1274
  12—2N1542
  23—T1492
  24—2N1274
  29—2N1274
  30—T1492
  49—2N1274
  54—2N1274
  59—2N2414
SCR 62—2N1595
Coil 39—1.2 henry
Diode:
  19—1N34A5
  33—1N34A5
  36—1N34A5
  37—1N34A5
  42—1N34A5
  56—1N34A5
Battery:
  2—22.5 volts
  16—90 volts
  68—22.5 volts Referring now to FIGURES 2 through 5, a detailed description of the physical structure of the bathythermograph will now be made. The bathythermograph, generally indicated by 76, is made up of a hollow front end section 77, a thermistor and electrical section 78, a mid-section 79, a spacing section 80, and a squib section 81, a tail-section 83, and finally a fin section 84. The hollow front-end section 77, better seen in FIGURES 2, 3 and 4, has dynamically shaped recesses 85 to lessen the shock when the bathythermograph enters the water medium. Recesses 86 co-operate with hollow channels 87, which are adapted to receive elongated bolts 88, and said bolts run full length of the body of the bathythermograph and thread into tail section 83 to hold the entire assembly together. Holes 88 are provided in the bottom surface of the hollow front end section to allow water to rapidly enter said holes due to the downward motion of the bathythermograph. Air is allowed to escape out of the top portion of the front end section 77 through the ports 89 to ensure rapid filling of the hollow space 90 of the front end section. The salt water switches 91 and the thermistor in the section 78 are schematically represented in FIGURE 4 to show the relationship thereof with said front end section.

The thermistor 92 is located at the outside surface of section 78 and is exposed to the atmosphere or the water medium when dropped therein. The thermistor 92 is secured against shock and a water seal is provided by a potting or resin type material. The thermistor is directly exposed to the water so that the temperature need not penetrate the case of the bathythermograph in order to influence the thermistor. Due to this arrangement, the thermistor assumes the water temperature almost immediately after it enters the water medium. This is contrasted by the time it takes for the salt water switches 91 to activate because of the delay in filling section 77 and their inherent electrical delay characteristics. The mid-section 79 and spacing section 80 contain batteries, leads, and other necessary structures all packed in potting material to avoid excessive shock effects when bathythermograph 76 enters the water. Squib section 81 has a plurality of squibs 82 mounted in the outer surface thereof and said squibs can be of any conventional type such as 22 caliber cartridges. The tail section terminates in a fin section 84, said two sections being secured together by bolt 95. The fins 94 are mounted at a slight angle to impart a rotating or cork-screw effect to the bathythermograph as it descends in the water. This of course adds stabilization to the vertical position of the bathythermograph regardless of under currents or other underwater effects.

Referring now to FIGURE 6, the method of operation and using the bathythermograph is now described. Assume now that a plurality of ships, aircrafts, and submarines in a particular area desire to have inforamtion of water temperature gradients to plot graphs thereof. The bathythermograph 76 is thereby dropped from a single aircraft or ship and plunges into the water. No visual indication of when the bathythermograph 76 enters the water is necessary because, as described above, the first squib that is set off acts as a reference for each individual receiver for the gathering of the gradient data. In practice, the first squib fires when the bathythermograph 76 is approximately 6 feet under water. At this time, the reference is set, and any unit deviation of temperature will be indicated by a single or double squib detonation as described above.

The audio signals of the bathythermograph 76 produced by the squib detonations are directly sent to surface vessels 96 and 97 and also submerged vessels 101, where said information is picked up by conventional equipment and the graph of the gradient plotted. A sonobuoy 100 is needed, however, to relay the audio information to aircraft in the area. When the sono-buoy picks up the audio data, said audio data is converted into RF energy and transmitted to all aircraft in the area, such as 98 and 99.

It can be seen then that none of the aircraft or vessels need deviate from their tactical mission or be slowed down to obtain the gradient data, and that the information can be received by one or any of a plurality of vessels and aircraft in the immediate area or range of the bathythermograph 76 or sono-buoy 100. The fact that a plurality of aircraft or vessels are at varying distances from the sono-buoy of bathythermograph does not interfere with the accuracy of the data collected, because each vessel or aircraft operates upon its own reference, which is the first squib fired when the bathythermograph enters the water medium.

It is particularly ponted out that the disclosure herein could be modified by one ordinarily skilled in the art to operate in other types of media besides water and detect other types of characteristics besides temperature, for example, pressure gradients, radio activity gradients, and magnetic field gradients.

The invention has been described with respect to a specific embodiment, many other equivalent embodiments will become apparent to those skilled in the art, and the present invention should be only limited by the scope of the depending claims.

What is claimed is:

1. A bathythermograph for sensing temperature variations in a liquid medium and emitting sonic signals for every predetermined unit of temperature change comprising temperature sensing means for sensing the temperature of the medium and developing an electrical signal corresponding to the value of the sensed temperature, sonic signaling means for emitting into the medium at least two types of sonic indications, one type representing a unit temperature decrease and the other representing a unit temperature increase, electrical threshold and storage means connected to receive the signal from said temperature sensing means and having an output coupled to apply its output signal to the sonic signal means for establishing and storing a starting voltage reference corresponding to the signal from said temperature sensing means when the bathythermograph becomes operational and developing a pulse of one polarity in response to a unit change in one direction of the signal developed by said sensing means and a pulse of the opposite polarity in response to a unit change in the oposnite direction of the signal developed by said sensing means, said sonic signaling means including control means receiving the signals from said threshold and storage means for effecting emanation of the corresponding type of sonic signal.

2. A bathythermograph as set forth in claim 1 wherein said threshold and storage means includes an electrical storage means charged to a level corresponding to the last signal value developed by said sensing means which caused emission of a sonic signal, and a threshold switch means coupled from the sensing means to the storage device for providing a normally high impedance path therebetween, said threshold switch means changing to a low impedance path whenever the difference between the stored value of said storage means and signal value developed by the sensing means reaches a predetermined magnitude for rapidly changing the stored value of said storage means, said storage means developing an output pulse having a polarity dependent upon the direction or sign of change of the stored value.

3. A bathythermograph as set forth in claim 2 wherein said threshold switch means inciudes a pair of serially connected switch stages each including regenerative transistor means of normally high serial impedance for switching to a serial low impedance upon sensing a signal level difference between its input and output terminals of greater than a predetermined value and opposite in sign from that to which the other threshold switch means responds, a rectifier connected in parallel with each threshold switch means and poled to provide a low impedance path for signals with a sign opposite that which its associated threshold switch means responds, the input of the first threshold switch means coupled to receive the signals developed by said temperature sensing means and the output of the second threshold switch means coupled to the storage means so that the stored signal level acts as a reference potential for the threshold switch means.

4. A bathythermograph as set forth in claim 1 wherein said sonic signaling means includes an apparatus for generating a sonic signal upon application of a power pulse, a power supply, coupling means including a gate electrode coupling said power supply to the apparatus to effect a signal whenever a control pulse is applied to said gate electrode, a switch means for applying control pulses to said gate electrode including a first diode receiving signals from said threshold and storage means and poled to pass pulses of one polarity for actuating the switch means and a second diode receiving signals from said threshold and storage means and poled to pass pulses of the opposite polarity, univibrator means having two outputs and receiving the signal from said second diode for developing a pulse on one output thereof and after a predetermined time developing a pulse at the other output thereof, third and fourth diodes each respectively receiving the output pulses of the univibrator outputs and applying for actuation passing pulses to said switch means, so that a pulse passed by said first diode effects one sonic signal emission and a pulse passed by said second diode effects two time spaced sonic signals.

5. A bathythermograph as set forth in claim 4 wherein said coupling means comprises a silicon controlled rectifier and the apparatus includes a plurality of squibs and a sequentially moving step switch armature, for electrically actuating one squib for every actuation of said coupling means, said switch means comprising a transistor having its output connected to said gate electrode and its control electrode connected to said first, third and fourth diodes.

6. A bathythermograph as set forth in claim 1 wherein said temperature sensing means includes a thermistor held in low thermal resistance with the ambient, a biasing circuit coupled to and operated by said thermistor for generating bias signals in accordance with the thermistor value, and transistor means when energized normally biased between cut-off and saturation having a control electrode coupled to receive the bias signals and develop an output signal level corresponding to the temperature value of the thermistor and applying the output signal to said threshold and storage means.

7. A bathythermograph as set forth in claim 1 further including salt-water power supply switches operatively coupled to the temperature sensing means, sonic signaling means, and threshold and storage means for energizing the same shortly after being placed in the medium, said bathythermograph including an elongated body with a rear fin section for imparting axial rotation as the body descends through the medium and a forward hollow section having openings at the front face and side walls to prevent immediate filling of said forward section upon entrance thereof into the medium, said salt-water switches being held exposed within and near the rear of said front section, said temperature sensing means including a thermistor secured in the side wall of the body and in low thermal resistant communication with the ambient so that upon entering the medium, the thermistor can quickly assume the temperature near the medium surface before the salt-water switches are actuated by the filling of said front section.

(References on following page)

References Cited

UNITED STATES PATENTS

| | | | |
|---|---|---|---|
| 3,135,943 | 6/1964 | Richard | 73—170 |
| 3,262,388 | 7/1966 | McCarty | 340—5 |
| 3,267,420 | 8/1966 | Pure | 340—5 |

LOUIS R. PRINCE, *Primary Examiner.*

DAVID SCHONBERG, *Examiner.*

FRED SHOON, *Assistant Examiner.*